UNITED STATES PATENT OFFICE.

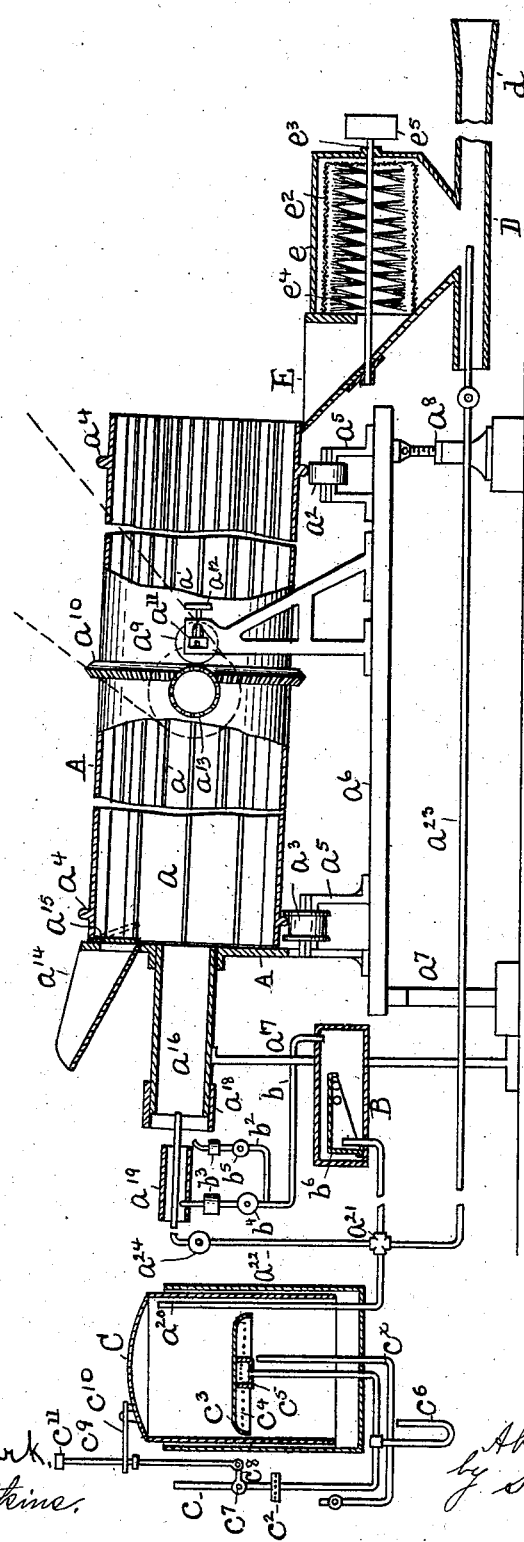

ABRAHAM T. WELCH, OF BALTIMORE, MARYLAND.

DRIER.

SPECIFICATION forming part of Letters Patent No. 708,604, dated September 9, 1902.

Original application filed October 22, 1897, Serial No. 656,062. Divided and this application filed June 7, 1901. Serial No. 63,659. (No model.)

*To all whom it may concern:*

Be it known that I, ABRAHAM T. WELCH, a citizen of the United States of America, and a resident of Baltimore city, State of Maryland, have invented certain new and useful Improvements in Driers, (application for which was filed in the United States Patent Office October 22, 1897, Serial No. 656,062, and of which the present application is a division,) of which the following is a specification.

The object is in a ready, efficient, and comparatively inexpensive manner, without burning or scorching, and with one and the same apparatus to dry, cook, cook and dry, process, cook and process, or cook, process, and dry different kinds of material by the direct application of unconfined heat.

With this object in view the invention consists in the apparatus for treating animal and vegetable matter by direct heat and superheated steam, as will be hereinafter fully described and claimed.

In the accompanying drawing, forming a part of this specification, and in which like letters of reference indicate corresponding parts, I have illustrated one form of apparatus capable of carrying my procedures into effect, although it is to be understood that other forms of embodiment may be employed without departing from the spirit of the same, and in this drawing the figure is a view in side elevation, partly in section, showing nn organized apparatus for carrying my invention into effect.

In the drawing, A designates a metallic cylinder having secured to its interior a plurality of shelves or knives $a$, the same increasing in number from the entrance end of the apparatus to the discharge end thereof— that is to say, in this instance there will be at the entrance end eight of these knives, farther on sixteen, and still farther on thirty-two—the object of this arrangement being to have the material when it first enters the apparatus picked up in masses and dropped through the heat, and as it is moved through the apparatus toward the discharge broken up into smaller particles, so that every part of the material being dried will be evenly subjected to the heat; but it is to be understood that in some instances the cylinder may be provided with the same number of knives throughout its entire length. The cylinder is here shown as mounted in an inclined position upon wheels or rollers $a^2$ and $a^3$, the periphery of the roller $a^2$ being smooth and that of the roller $a^3$ provided with flanges, these rollers being engaged by bands or tracks $a^4$, secured around the cylinder. The object of the flanges on the roller $a^3$ is to prevent retrograde movement of the cylinder, due to its inclined position. The brackets or supports $a^5$ for the rollers are mounted upon transverse or bed pieces $a^6$, only one being shown in this instance, and these beams are supported at the entrance end of the machine upon uprights $a^7$ and at the discharge end upon screw-jacks $a^8$. It will be seen that by raising the screw-jacks the inclination of the discharge end of the cylinder may be changed to increase or diminish the feed, according to the character of the material being dried. The front or entrance end of the cylinder is closed by a head-plate $A^2$, and to keep the cylinder against this plate at all times when in operation to prevent escape of material at this point I provide in this instance two adjustable rollers $a^9$, (only one being shown,) which bear against the band-gear $a^{10}$, secured to the exterior of the drum. The shaft of the roller $a^9$ is journaled in an adjustable box $a^{11}$, against which bears a screw $a^{12}$. By moving this screw the roller will be forced against the band-gear $a^{10}$, and thus keep the cylinder against the head-plate for the purpose mentioned. The band-gear $a^{10}$ is engaged by a bevel-gear $a^{13}$, driven from a suitable source of power, as by a belt and pulley, (indicated in dotted lines.) The head is provided with a hopper $a^{14}$, the opening in the head through which the material passes from this hopper to the interior of the cylinder being covered by a hinged door $a^{15}$, which will readily open inward when the material is feeding into the apparatus, but will otherwise be closed by gravity to prevent escape of heat and all bad odors.

The mechanism for supplying heat to the drier comprises a combustion-chamber $a^{16}$, fixed at its inner portion to the head-plate $A^2$ and supported at its outer portion by a standard $a^{17}$. Mounted upon the outer end of the chamber $a^{16}$ is a movable collar $a^{18}$, the function of which is to increase or diminish the draft or pull on the flame from the gas-outlet $a^{19}$, the latter being designed to keep the flame circular—that is to say, separate and distinct from and between the air forced and induced—to prevent rapid and consequent too sudden cooling of the gas by admixture with atmospheric air, and by radiation alone to heat the air in the combustion-chamber gradually from the inlet to the outlet end thereof, at which latter point there will be perfect combustion. The combustion-chamber herein shown is open at both ends, between which and the injector-burner there is sufficient space to permit of the collar $a^{18}$ being moved to and from the burner on the injector-burner. Thus if the collar is moved up close to the burner there will be a strong pull on the flame from the burner or injector, and if the collar is moved back, so as to increase the space between the two chambers, the pull will be diminished. The object of this arrangement is to vary the force or projection of the flame into the cylinder, so as to be able to prevent too-sudden chilling of the gas-flame with cold air. The heating medium in this instance is gas, the same being supplied from the carbureter B through a pipe $b$, and tapped into this pipe $b$ is a by-pass pipe $b^2$, terminating adjacent to the outer end of the gas-outlet and constituting a pilot-burner for the injector-burner, and on both these pipes $b$ and $b^2$ there is a flame-arrester $b^3$ to prevent the flame from going back into the pipe, valves $b^4$ and $b^5$ being provided for the purpose of regulating the supply of gas and air to the compound injector-burner. The air from the carbureter is supplied from an ordinary airometer C, into which steam is supplied through a pipe $c$, leading to a suitable source of supply. On this pipe $c$ is an injector $c^2$, which operates to force air and steam with great force into the receiver, and on the pipe $c$ is arranged a dish-shaped deflecting-plate $c^3$, having peripheral openings $c^4$, through which the steam and air escape into the water contained in the airometer, the steam being condensed and the air from the pipe $c$ escaping through a chamber $c^5$, secured to the upper end of the pipe and provided with openings similar to those of the deflecting-plate. The deflector $c^3$ may be omitted when damp air or superheated steam is necessary. In order to drain partial condensation, the pipe $c$ is provided with a trap $c^6$.

In order to regulate the supply of steam to the airometer in proper quantities and also to prevent the drum or cap of the airometer from being forced to too great a height by the effect of the steam, the pipe $c$ is provided with a valve $c^7$, to the stem of which is connected a lever $c^8$, and to this lever is connected a rod $c^9$, which passes through an arm $c^{10}$, secured to the top of the airometer. Upon the rod $c^9$ are two stops $c^{11}$ and $c^{12}$, the same being situated at a distance apart equal to the height the drum of the airometer is to lift and drop. When the airometer has reached the limit of its upward stroke, the arm $c^{10}$ by contacting with the stop $c^{11}$ will lift the lever $c^8$, and thereby close the valve $c^7$, and when the cap sinks the arm $c^{10}$ will contact with the stop $c^{12}$ and depress this lever $c^8$, and thereby again open the valve. By this arrangement the supply of air to the airometer in proper quantities is automatically governed.

Arranged within the airometer and with its discharge end above the water-level thereof is a pipe $a^{20}$, the other end of which projects upward under the float $b^6$ on the carbureter. This pipe $a^{20}$ carries a four-way coupling $a^{21}$, and attached to this coupling are two pipes, one of which, $a^{22}$, passes through the burner and into the combustion-chamber $a^{16}$, and the other pipe $a^{23}$ enters a flue or conveyer-pipe $d$, presently to be described. The pipe $a^{22}$ carries a valve $a^{24}$, by which the supply of air to the combustion-chamber may be regulated at will. At the discharge end of the cylinder is arranged a hopper E, and in an extension or chamber $e$, forming a part of this hopper, is arranged a cylindrical screen $e^2$, inclosing a shaft $e^3$, carrying brushes $e^4$. The shaft $e^3$ is journaled in suitable bearings formed in the extension of the hopper and in the rear wall thereof and carries at one end a pulley $e^5$, which may be driven from any suitable source of power. Below the screen $e^2$ the walls of the hopper converge and merge into the flue or discharge-pipe D, and this flue may lead to any suitable point of deposit, as into a room, and the discharge end of the flue is flared at $d$ in order to reduce the speed of discharge, and thereby obviate generation of dust. The pipe $a^{23}$ projects beyond the center line of the lower portion of the hopper, so that material flowing from the circular screen will not have a chance to escape from the rear end of the flue, but will be forced outward to the place of deposit. The object of the screen is to refine dried substances, so that any remaining moisture will be driven off by the air to which it is subjected as it passes through the flue D, the supply of air through the pipe $a^{23}$ being continuous and under considerable pressure.

The apparatus herein described is particularly adapted for processing fish, the processing being accomplished by subjecting the fish when wettest alternately to high and low degrees of heat, the heat progressively decreasing as the material nears the discharge end of the apparatus. It will thus be seen that by this arrangement there will be no danger of scorching or burning the fish, as the heat decreases in direct proportion as the moisture evaporates, so that by the time the material has reached the discharge end of the cylinder there will not be sufficient heat to scorch the same. By the employment of the knives or shelves the material will be picked up and rapidly dropped through the flame to the bottom side of the cylinder, the flame being projected into the cylinder from the chamber $a^{16}$, this alternate picking up and dropping of the material being kept up throughout the entire length of the cylinder, so that the material is out of direct contact with the heat for a greater period than it is in direct contact with it, this interval of time in which the material is out of direct contact with the flame being sufficient to permit the fish thoroughly to absorb the heat, which will thus pass through the entire mass. It will be seen, therefore, that the material lies normally in a plane removed from the direct path of the heat and is only subjected to direct contact with the heat when falling through the upper side to the lower side of the cylinder. The material now passes to the screen and is there finely broken up, and any remaining moisture will be thoroughly eliminated by the blast from the pipe $a^{23}$. If desired, the fish may be processed and partly dried in one apparatus and may be dried in another, or the drying and processing may be carried on in one apparatus.

In addition to its adaptability for drying fish this apparatus will be equally adaptable for drying, curing, and threshing grain. The grain will be fed through the hopper $a^{14}$, and in passing through the heated flame will be slowly dried and the hull expanded without burning, and the husk will be threshed by contact with the shelves or knives.

Having thus fully described my invention, what I claim as new, and desire to secure by Letters Patent, is—

1. In a drier the combination with an inclined rotating drum, open at one end and closed at the other by a stationary wall, means for projecting a flame through said wall into said drum at a substantial distance above the base of said drum, means for feeding material to be dried into said drum through said wall, means for rotating said drum, and means for varying the inclination of said drum.

2. In a drier the combination with an inclined rotating drum, open at one end and closed at the other by a stationary wall, means for projecting a flame through said wall into said drum, means for feeding material to be dried into said drum through said wall, means for rotating said drum, means whereby by the rotation of said drum material is fed through the same and dropped through successive parts of the flame, and means for varying the rate of feed through said drum.

3. In a drier the combination with a drum of means for projecting a flame into said drum at a substantial distance above the base of said drum, means for feeding material to be dried into and through said drum, means for delivering the material from the drum, and means for agitating the material to be dried in cooler air after it has been discharged from the drum.

4. In a drier the combination with a drum of means for projecting a flame into the drum at a substantial distance above the base of said drum, means for feeding the material to be dried into and through said drum, means for agitating the material to be dried in cooler air after it has been discharged from the drum, and means for discharging the material from said agitating means.

5. In a drier the combination with a drum of means for projecting a flame into said drum at a substantial distance above the base of said drum, means for feeding material into and through said drum, means for agitating the material after it is discharged from the drum in cooler air, said agitating means consisting of a screen and a rotating brush.

6. In a drier the combination with a drum of means for projecting a flame into said drum at a substantial distance above the base of said drum, means for feeding material into and through said drum, means for agitating the material after it is discharged from the drum in cooler air, said agitating means consisting of a screen and a rotating brush, and means for discharging material from said agitating means.

Signed by me at Baltimore city, State of Maryland, this 22d day of May, 1901.

ABRAHAM T. WELCH.

Witnesses:
 HOWARD D. ADAMS,
 NORRIS G. CLARK.